United States Patent
Kim et al.

(10) Patent No.: US 12,293,603 B2
(45) Date of Patent: May 6, 2025

(54) ELECTRONIC DEVICE AND METHOD OF MANUFACTURING THE SAME

(71) Applicant: Samsung Display Co., Ltd., Yongin-Si (KR)

(72) Inventors: Taesung Kim, Suwon-si (KR); Yunjong Yeo, Hwaseong-si (KR); Hyunmin Cho, Hwaseong-si (KR); Bokwang Song, Hwaseong-si (KR); Byung Han Yoo, Suwon-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 5 days.

(21) Appl. No.: 17/677,031

(22) Filed: Feb. 22, 2022

(65) Prior Publication Data

US 2022/0335742 A1 Oct. 20, 2022

(30) Foreign Application Priority Data

Apr. 19, 2021 (KR) .................. 10-2021-0050722

(51) Int. Cl.
 *G06V 40/13* (2022.01)
(52) U.S. Cl.
 CPC ...... *G06V 40/1306* (2022.01); *G06V 40/1318* (2022.01); *G06V 40/1329* (2022.01)
(58) Field of Classification Search
 None
 See application file for complete search history.

(56) References Cited

U.S. PATENT DOCUMENTS

| | | | |
|---|---|---|---|
| 2019/0050621 A1* | 2/2019 | Xu | G06V 40/1318 |
| 2020/0012832 A1* | 1/2020 | Yue | G06V 40/1318 |
| 2020/0210669 A1* | 7/2020 | Lee | H01L 27/14678 |
| 2021/0124890 A1* | 4/2021 | Hai | G02B 1/045 |
| 2021/0159466 A1 | 5/2021 | Kim et al. | |
| 2021/0366933 A1* | 11/2021 | Zhang | H10K 59/126 |
| 2022/0052094 A1* | 2/2022 | Chen | H01L 27/14627 |
| 2022/0067326 A1* | 3/2022 | Wang | G06V 40/1324 |
| 2022/0171956 A1* | 6/2022 | Shi | H01L 27/3234 |
| 2022/0271098 A1* | 8/2022 | Xu | G06V 40/1318 |

FOREIGN PATENT DOCUMENTS

| | | | | |
|---|---|---|---|---|
| CN | 107958191 A | * | 4/2018 | ......... G06K 9/0004 |
| CN | 212009590 U | | 11/2020 | |
| CN | 112151572 A | | 12/2020 | |
| KR | 10-2020-001084 A | | 1/2020 | |
| KR | 10-2020-0010834 | | 1/2020 | |

* cited by examiner

*Primary Examiner* — Benjamin X Casarez
(74) *Attorney, Agent, or Firm* — Innovation Counsel LLP

(57) ABSTRACT

An electronic device includes a display panel, a biometric information sensing layer disposed under the display panel and including a sensor, and an optical pattern layer disposed between the display panel and the biometric information sensing layer and including a plurality of transmissive portions and a light blocking portion. The light blocking portion includes a light blocking layer disposed on the biometric information sensing layer, an intermediate layer disposed on the light blocking layer, and a metal layer disposed on the intermediate layer.

17 Claims, 11 Drawing Sheets

ELECTRONIC DEVICE AND METHOD OF MANUFACTURING THE SAME

CROSS-REFERENCE TO RELATED APPLICATION

This U.S. non-provisional patent application claims priority under 35 U.S.C. § 119 to Korean Patent Application No. 10-2021-0050722, filed on Apr. 19, 2021, the contents of which are hereby incorporated by reference in its entirety.

BACKGROUND

1. Field of Disclosure

The present disclosure relates to an electronic device and a method of manufacturing the same. More particularly, the present disclosure relates to an electronic device having a fingerprint recognition function and a method of manufacturing the electronic device.

2. Description of the Related Art

Electronic devices provide a variety of functions to communicate organically with users such as displaying images to provide information to a user or sensing a user input. In recent years, the display devices include various functions to sense a fingerprint of the user. As the fingerprint recognition methods, a capacitance method that senses a variation in capacitance between electrodes, an optical method that senses an incident light using an optical sensor, an ultrasonic method that senses a vibration using a piezoelectric material, or the like are used. Nowadays, a sensing layer to recognize the fingerprint is disposed on a rear surface of a display panel in the electronic devices.

SUMMARY

The present disclosure provides an electronic device including a sensing layer with improved fingerprint recognition sensitivity.

The present disclosure provides a method of manufacturing the electronic device.

Embodiments of the inventive concept provide an electronic device including a display panel, a biometric information sensing layer disposed under the display panel and including a sensor, and an optical pattern layer disposed between the display panel and the biometric information sensing layer and including a plurality of transmissive portions and a light blocking portion. The light blocking portion includes a light blocking layer disposed on the biometric information sensing layer, an intermediate layer disposed on the light blocking layer, and a metal layer disposed on the intermediate layer.

A ratio of a thickness of the light blocking layer to a width of each of the transmissive portions is about 2:1.

The thickness of the light blocking layer is within a range from about 4 μm to about 5 μm.

The width of each of the transmissive portions is the same as the shortest distance between two transmissive portions adjacent to each other among the transmissive portions.

The light blocking layer includes a non-transmissive material, and the intermediate layer includes a transmissive material or the non-transmissive material.

The optical pattern layer further includes a transmissive layer covering the light blocking portion and filling the transmissive portions.

The transmissive layer covering the light clocking portion and filling the transmissive portions includes a same material.

The transmissive layer has a thickness greater than a thickness of the light blocking layer.

The metal layer includes at least one of molybdenum, titanium, and aluminum.

The display panel includes an active area in which an image is displayed and a peripheral area surrounding the active area, the biometric information sensing layer includes a sensing area in which biometric information are sensed, and the sensing area entirely overlaps the active area.

The electronic device further includes a stopper layer disposed between the biometric information sensing layer and the optical pattern layer.

The transmissive layer disposed in each of the transmissive portions has a thickness smaller than a sum of thicknesses of the light blocking layer, the intermediate layer, and the metal layer.

The optical pattern layer further includes an additional pattern layer disposed on the metal layer.

Embodiments of the inventive concept provide a method of manufacturing an electronic device. The method includes forming a preliminary light blocking layer on a biometric information sensing layer including a sensor, forming a preliminary intermediate layer on the preliminary light blocking layer, forming a preliminary metal layer on the preliminary intermediate layer, patterning the preliminary metal layer, the preliminary intermediate layer, and the preliminary light blocking layer to form a metal layer, an intermediate layer, and a light blocking layer through which a plurality of transmissive portions are formed, and forming a transmissive layer filling the plurality of transmissive portions and covering an upper surface of the metal layer.

The forming of the transmissive portions includes etching the preliminary metal layer, the preliminary intermediate layer, and the preliminary light blocking layer in the plurality of transmissive portions using a same etching mask.

The preliminary light blocking layer including a non-transmissive material.

A ratio of a thickness of the light blocking layer to a width of each of the plurality of transmissive portions is about 2:1.

The method further includes forming an additional pattern layer on the metal layer.

A cover portion covering the metal layer has a thickness greater than a thickness of the metal layer.

The method further includes removing the cover portion to expose the upper surface of the metal layer.

According to the above, the electronic device manufactured by the manufacturing method has improved fingerprint recognition sensitivity.

According to the above, the optical pattern layer which controls an incident angle of the light incident thereto after being reflected by the fingerprint includes the light blocking layer, the intermediate layer, and the metal layer patterned using a same mask, and thus, the manufacturing process of the sensing layer is simplified.

According to the above, the light blocking portion includes the light blocking layer having a predetermined thickness and the metal layer disposed at an upper portion thereof.

Thus, the incident angle of the light reflected by the fingerprint is controlled and the fingerprint recognition sensitivity is improved.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
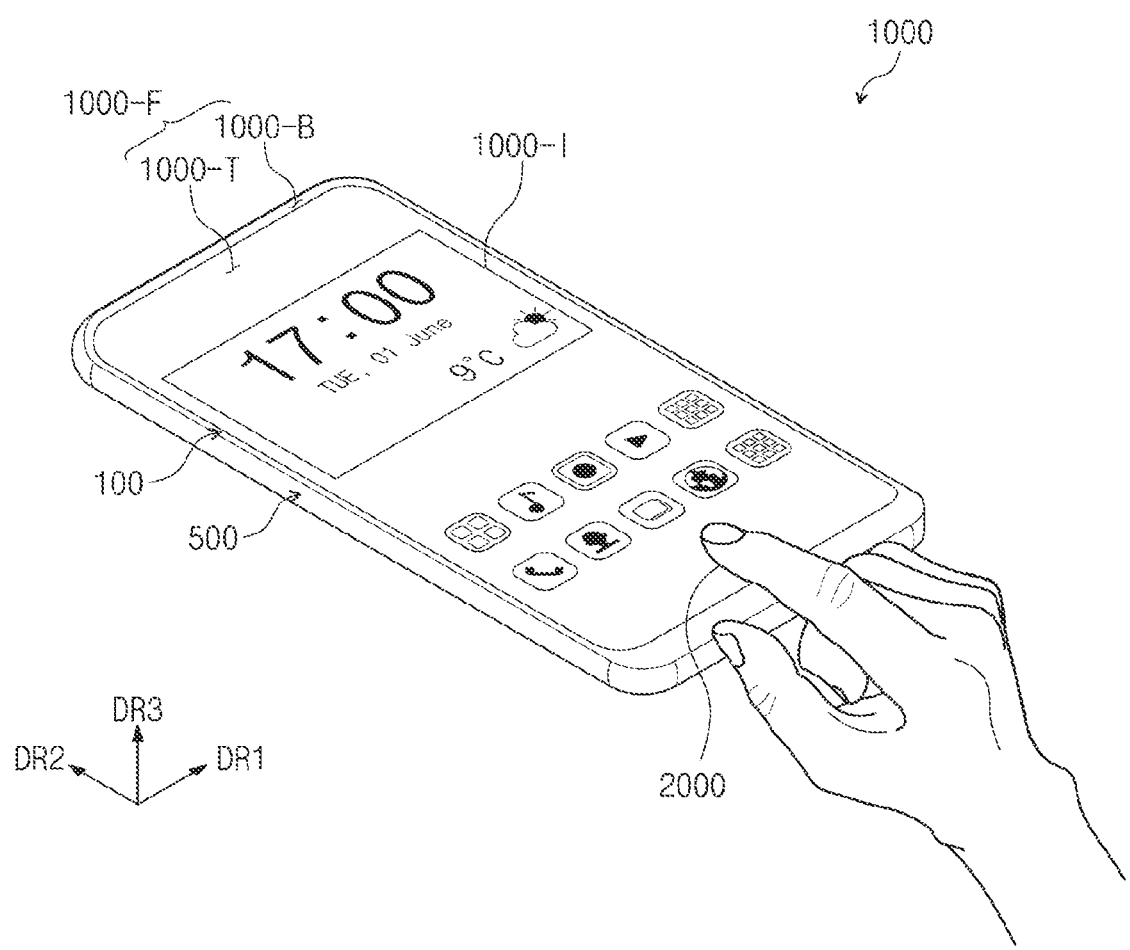
FIG. 1 is a perspective view showing an electronic device according to an embodiment of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be explained in detail with reference to the accompanying drawings.

Figure 2:
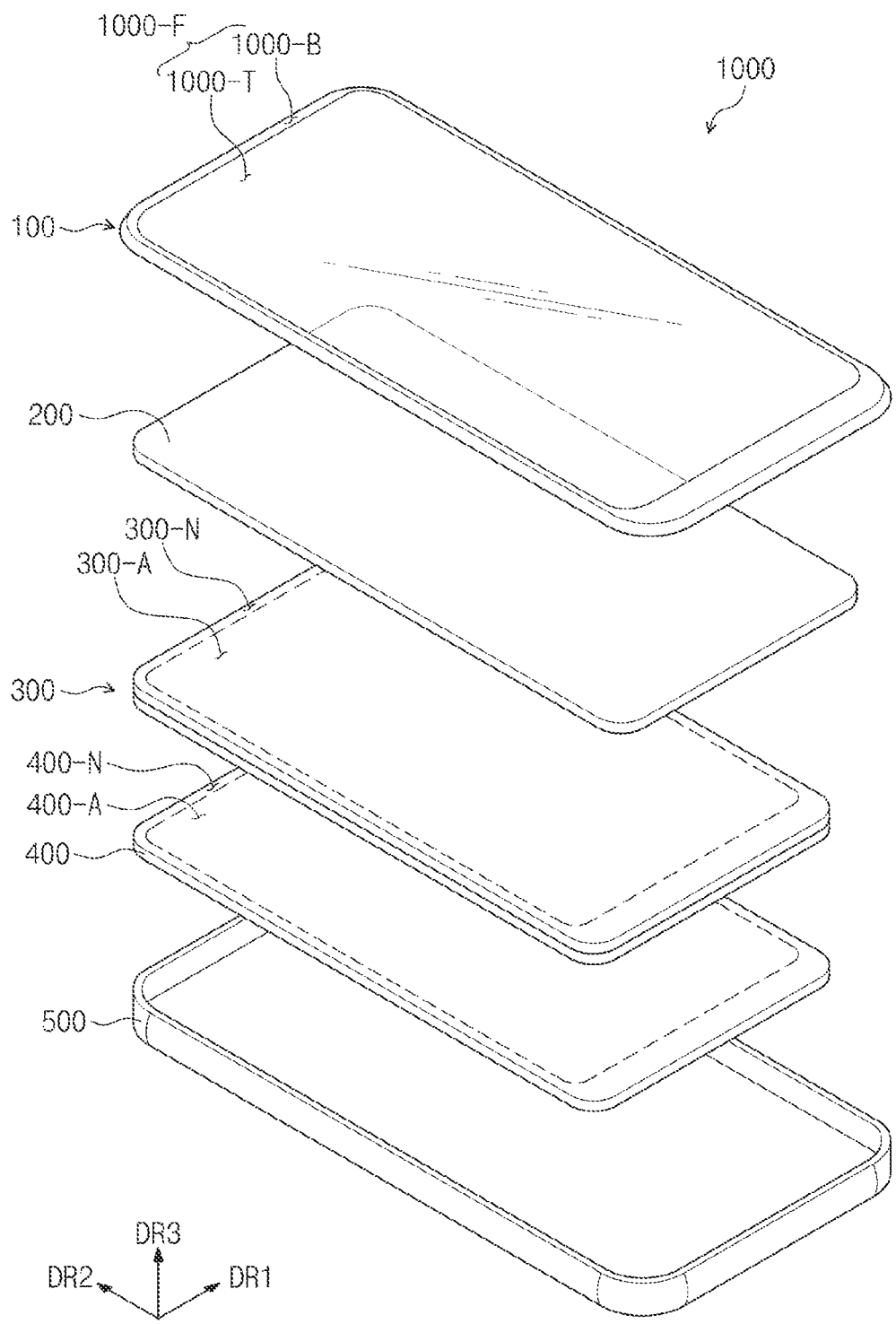
FIG. 2 is an exploded perspective view showing an electronic device according to an embodiment of the present disclosure.

FIG. 1 is a perspective view showing an electronic device 1000 according to an embodiment of the present disclosure, and FIG. 2 is an exploded perspective view showing the electronic device 1000 according to an embodiment of the present disclosure.

Referring to FIGS. 1 and 2, the electronic device 1000 may be a device activated in response to an electrical signal. The electronic device 1000 may include various embodiments. For example, the electronic device 1000 may be applied to a large-sized electronic item such as a television set, a monitor, and an outdoor billboard, and a small and medium-sized electronic item such as a personal computer, a notebook computer, a personal digital assistant, a car navigation unit, a game unit, a mobile electronic device, and a camera. These are merely examples, and thus, the electronic device 1000 may be applied to other electronic devices as long as they do not depart from the concept of the present disclosure. In the present embodiment, a smartphone will be described as a representative example of the electronic device 1000.

The electronic device 1000 may display an image 1000-I through a display surface 1000-F which is substantially parallel to each of a first direction DR1 and a second direction DR2 toward a third direction DR3. The image 1000-I may include a still image as well as moving pictures. FIG. 1 shows a clock widget and application icons as a representative example of the image 1000-I. The display surface 1000-F through which the image 1000-I is displayed may correspond to a front surface of the electronic device 1000 and to a front surface of a window 100.

In the present embodiment, front (or upper) and rear (or lower) surfaces of each member of the electronic device 1000 are defined with respect to a direction in which the image 1000-I is displayed. The front and rear surfaces face each other in the third direction DR3, and a normal line direction of each of the front and rear surfaces is substantially parallel to the third direction DR3. In the following descriptions, the expression "when viewed in a plane" may mean a state of being viewed in the third direction DR3.

According to an embodiment, the electronic device 1000 may sense a user input applied thereto from the outside. The user input may include various types of external inputs, such as a part of the user's body, light, heat, and pressure. In addition, the electronic device 1000 may sense the user input applied to a side or rear surface of the electronic device 1000 depending on its structure, however, it should not be limited to a specific embodiment.

The electronic device 1000 may sense a user's fingerprint 2000 applied thereto from the outside. The display surface 1000-F of the electronic device 1000 may include a fingerprint recognition area defined therein. The fingerprint recognition area may be provided in all areas of a transmissive area 1000-T or may be provided in some areas of the transmissive area 1000-T.

The electronic device 1000 may include the window 100, an anti-reflective panel 200, a display module 300, a sensing layer 400, and a housing 500. In the present embodiment, the window 100 and the housing 500 may be coupled to each other to provide an exterior of the electronic device 1000.

The window 100 may include an optically transparent insulating material. For example, the window 100 may include a glass or plastic material. The window 100 may have a single-layer or multi-layer structure. As an example, the window 100 may include a plurality of plastic films attached to each other by an adhesive or a glass substrate and a plastic film attached to the glass substrate by an adhesive.

The front surface 1000-F of the window 100 may define the front surface of the electronic device 1000 as described above. The transmissive area 1000-T may be an optically transparent area. For example, the transmissive area 1000-T may be an area having a visible light transmittance of about 90% or more.

A bezel area 1000-B may be an area having a relatively lower transmittance as compared with the transmissive area 1000-T. The bezel area 1000-B may define a shape of the transmissive area 1000-T. The bezel area 1000-B may be disposed adjacent to the transmissive area 1000-T and may surround the transmissive area 1000-T.

The bezel area 1000-B may have a predetermined color. The bezel area 1000-B may cover a peripheral area 300-N of the display module 300 to prevent the peripheral area 300-N from being viewed from the outside. However, this is merely one example, and the bezel area 1000-B may be omitted from the window 100 according to an embodiment of the present disclosure.

The anti-reflective panel 200 may be disposed under the window 100. The anti-reflective panel 200 may reduce a reflectance of an external light incident thereto from above the window 100. According to an embodiment, the anti-reflective panel 200 may be omitted or may be included in the display module 300.

The display module 300 may display the image 1000-I and may sense the external input. The display module 300 may include an active area 300-A and the peripheral area 300-N. The active area 300-A may be an area activated in response to an electrical signal.

In the present embodiment, the active area 300-A may be an area through which the image 1000-I is displayed and the external input is sensed. The transmissive area 1000-T may overlap the active area 300-A. For example, the transmissive area 1000-T may overlap an entire surface or at least a portion of the active area 300-A. Accordingly, a user may perceive the image 1000-I or may provide the external input through the transmissive area 1000-T. According to an embodiment, an area through which the image 1000-I is displayed and an area through which the external input is sensed may be separated from each other in the active area 300-A, but they should not be limited to a particular embodiment.

The peripheral area 300-N may be covered by the bezel area 1000-B. The peripheral area 300-N may be disposed adjacent to the active area 300-A. The peripheral area 300-N may surround the active area 300-A. A driving circuit or a driving line may be disposed in the peripheral area 300-N to drive the active area 300-A.

The sensing layer 400 may be disposed under the display module 300. The sensing layer 400 may be a layer in which biometric information of the user are sensed. The sensing layer 400 may sense a surface of a touch object. The surface may have information about the user's fingerprint 2000 such as a surface uniformity, a shape of surface roughness, etc.

The sensing layer 400 may include a sensing area 400-A and a non-sensing area 400-N. The sensing area 400-A may be activated in response to electrical signals. As an example, the sensing area 400-A may be an area in which the biometric information are sensed. A driving circuit or a driving line may be disposed in the non-sensing area 400-N to drive the sensing area 400-A.

According to an embodiment, the sensing area 400-A may overlap an entire of the active area 300-A. In this case, the fingerprint may be recognized over the entire of the active area 300-A. That is, the user's fingerprint may be recognized in the entire area without being limited to specific areas, however, the present disclosure should not be limited thereto or thereby. As an example, according to an embodiment, the sensing layer 400 may overlap a portion of the active area 300-A.

The housing 500 may be coupled to the window 100. The housing 500 may be coupled to the window 100 to provide a predetermined inner space. The display module 300 and the sensing layer 400 may be accommodated in the inner space. The housing 500 may stably protect components of the electronic device 1000 accommodated in the inner space from external impacts. The housing 500 may include a material with a relatively high rigidity. For example, the housing 500 may include a glass, plastic, or metal material or a plurality of frames and/or plates of combinations thereof.

Although not shown in figures, a battery module may be disposed between the sensing layer 400 and the housing 500 to supply a power necessary for an overall operation of the electronic device 1000.

Figure 3:
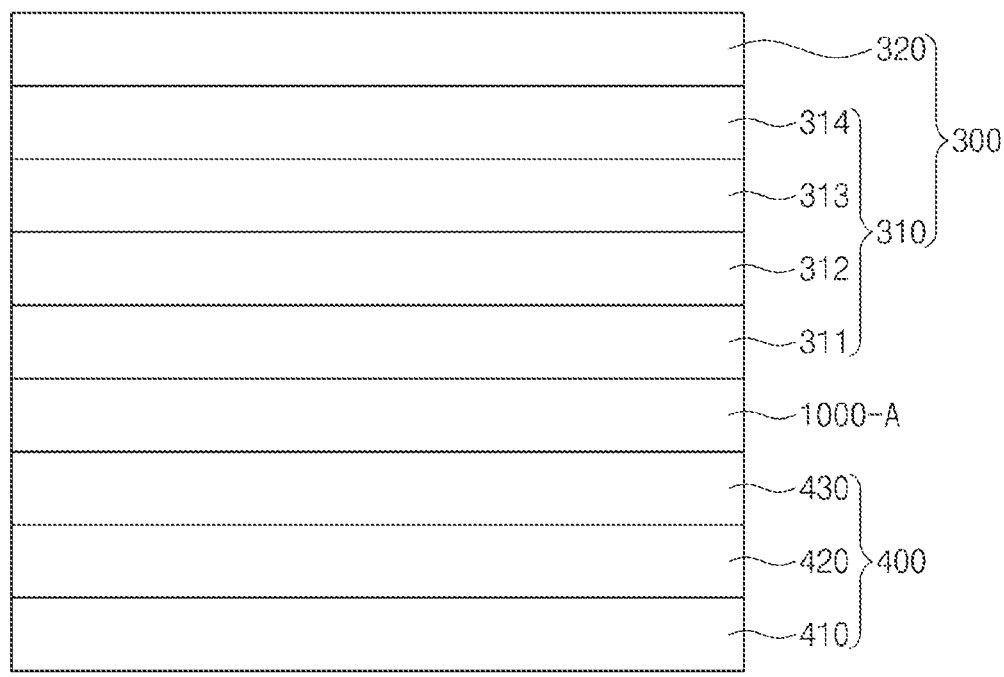
FIG. 3 is a cross-sectional view schematically showing an electronic device according to an embodiment of the present disclosure.
Figure 3:
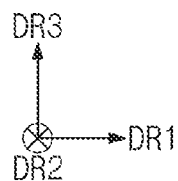

FIG. 3 is a cross-sectional view showing some elements of the electronic device 1000 according to an embodiment of the present disclosure. FIG. 3 schematically shows elements of the display module 300 and the sensing layer 400.

Referring to FIG. 3, the display module 300 may include a display panel 310 and an input sensing layer 320.

The display panel 310 may be a layer providing an image. The active area 300-A (refer to FIG. 2) of the display module 300 may correspond to an active area of the display panel 310. That is, the sensing area 400-A (refer to FIG. 2) of the sensing layer 400 may overlap an entire of the active area of the display panel 310.

The display panel 310 may include a base layer 311, a circuit layer 312, a light emitting element layer 313, and an encapsulation layer 314.

The base layer 311 may include a synthetic resin layer. The synthetic resin layer may include a heat-curable resin. The synthetic resin layer may include a polyimide-based resin, however, a material for the synthetic resin layer should not be particularly limited. The synthetic resin layer may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, and a perylene-based resin. According to an embodiment, the base layer 311 may include a glass substrate, a metal substrate, or an organic/inorganic composite substrate.

The circuit layer 312 may be disposed on the base layer 311. The circuit layer 312 may include a pixel circuit and insulating layers. The pixel circuit may include at least one transistor and at least one capacitor.

The light emitting element layer 313 may be disposed on the circuit layer 312. The light emitting element layer 313 may emit a light. The light emitting element layer 313 may emit the light or may control a light amount in response to an electrical signal. In a case where the display panel 310 is an organic light emitting display panel, the light emitting element layer 313 may include an organic light emitting material. In a case where the display panel 310 is a quantum dot light emitting display panel, the light emitting element layer 313 may include a quantum dot or a quantum rod.

The encapsulation layer 314 may be disposed on the light emitting element layer 313. The encapsulation layer 314 may include at least one insulating layer. As an example, the encapsulation layer 314 may include at least one inorganic layer and at least one organic layer. The inorganic layer may protect the light emitting element layer 313 from moisture and oxygen, and the organic layer may protect the light emitting element layer 313 from a foreign substance such as dust particles.

The input sensing layer 320 may be disposed on the display panel 310. The input sensing layer 320 may sense the external input and may obtain location information of the external input. The external input may include various embodiments. As an example, the external input may include external inputs of various forms such as a part of user's body, light, heat, and pressure. In addition, the input sensing layer 320 may sense an input approaching close to the window 100 (refer to FIG. 2) in addition to the input that is in direct contact with the window 100 (refer to FIG. 2).

The input sensing layer 320 may be disposed directly on the display panel 310. As an example, the input sensing layer 320 may be formed on the display panel 310 through successive processes. According to an embodiment, the input sensing layer 320 may be attached to the display panel 310. In this case, an adhesive layer may be further disposed between the input sensing layer 320 and the display panel 310.

The sensing layer 400 may be disposed under the display module 300. As an example, the sensing layer 400 may be attached to the rear surface of the display panel 310. An adhesive layer 1000-A may be disposed between the sensing layer 400 and the display panel 310. The adhesive layer 1000-A may be an optically transparent adhesive member, and the adhesive layer 1000-A may include an ordinary adhesive.

The sensing layer 400 may include a base layer 410, a biometric information sensing layer 420, and an optical pattern layer 430.

The base layer 410 may include a synthetic resin layer. The synthetic resin layer may include a heat-curable resin. In particular, the synthetic resin layer may be a polyimide-based resin layer, however, a material for the synthetic resin layer should not be limited thereto or thereby. As an example, the base layer 410 may include two polyimide-based resin layers and a barrier layer disposed between the polyimide-based resin layers. The barrier layer may include amorphous silicon and silicon oxide.

The biometric information sensing layer 420 may be disposed on the base layer 410. The biometric information sensing layer 420 may include a sensing circuit and insulating layers. The sensing circuit may include at least one transistor and at least one photodiode.

The optical pattern layer 430 may be disposed directly on the biometric information sensing layer 420. As an example, the optical pattern layer 430 may be formed through successive processes on the biometric information sensing layer 420. The optical pattern layer 430 may filter a light incident to the biometric information sensing layer 420. As an example, an incident angle that allows the light to pass through the optical pattern layer 430 may be controlled by the optical pattern layer 430. As an example, the incident angle may be limited to a predetermined angle or less. As the incident angle is limited, an accuracy of the fingerprint recognition may be improved.

Figure 4:
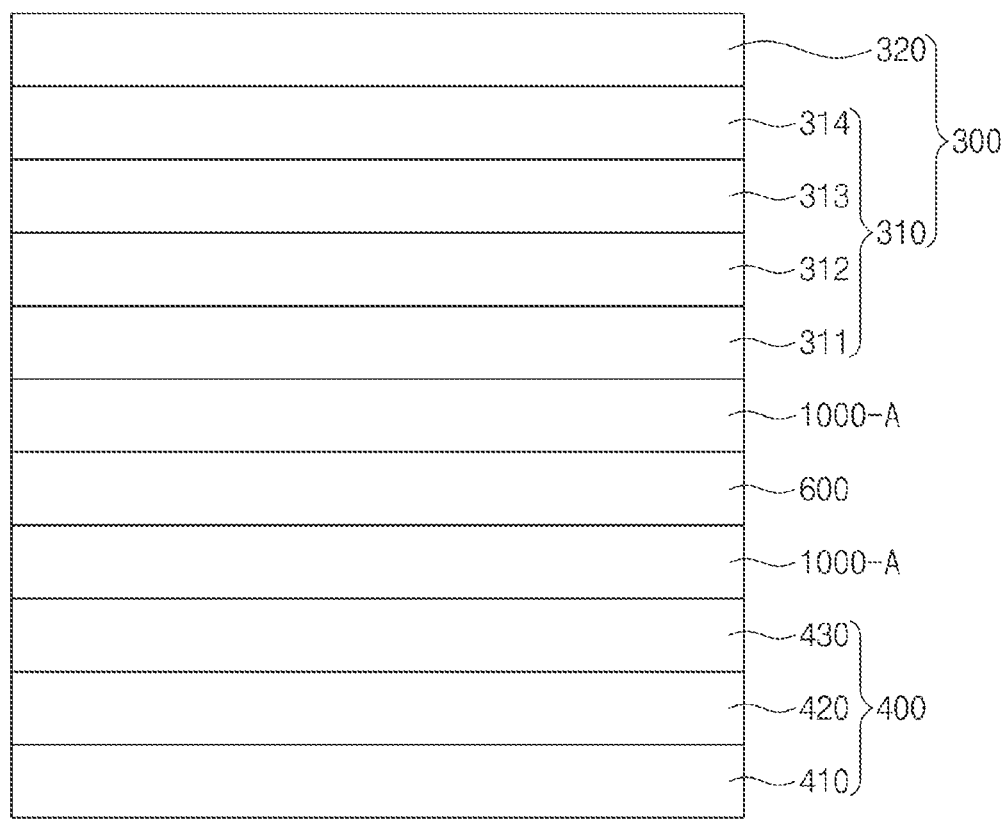
FIG. 4 is a cross-sectional view schematically showing an electronic device according to an embodiment of the present disclosure.
Figure 4:
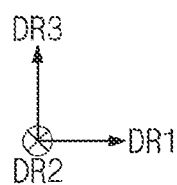

FIG. 4 is a cross-sectional view schematically showing an electronic device according to an embodiment of the present disclosure. In FIG. 4, different features from those of FIG. 3 will be mainly described, the same reference numerals denote the same elements in FIG. 3, and thus, detailed descriptions of the same elements will be omitted.

Referring to FIG. 4, an infrared filter 600 may be further disposed between the display module 300 and the sensing layer 400. The infrared filter 600 may be a filter that blocks an infrared light and filters a visible light.

A light reflected by the user's fingerprint 2000 (refer to FIG. 1) may be the visible light. According to the present embodiment, as the infrared filter 600 blocks a light having a wavelength band that does not correspond to a wavelength band of a light reflected by the fingerprint 2000, a fingerprint recognition accuracy of the biometric information sensing layer 420 may be improved.

The adhesive layer 1000-B may be disposed between the infrared filter 600 and the display module 300 and between the infrared filter 600 and the sensing layer 400.

Figure 5:
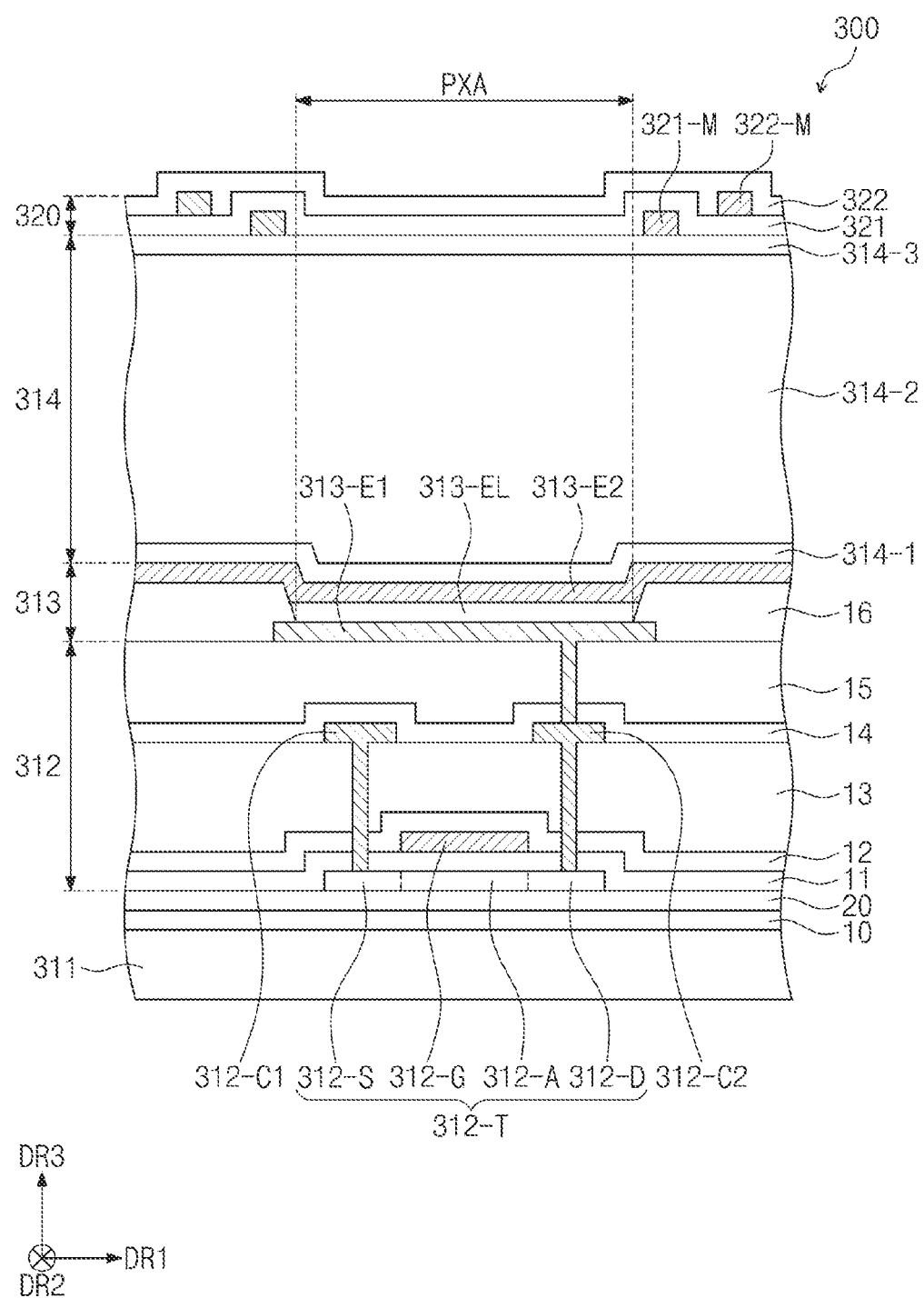
FIG. 5 is a cross-sectional view showing a display module according to an embodiment of the present disclosure.

FIG. 5 is a cross-sectional view showing the display module 300 according to an embodiment of the present disclosure.

Referring to FIG. 5, the circuit layer 312, the light emitting element layer 313, the encapsulation layer 314, and the input sensing layer 320 may be sequentially stacked on the base layer 311.

A barrier layer 10 may be disposed on the base layer 311. The barrier layer 10 may prevent a foreign substance from entering the base layer. The barrier layer 10 may include at least one of a silicon oxide layer and a silicon nitride layer. Each of the silicon oxide layer and the silicon nitride layer may be provided in plural and the silicon oxide layers may be alternately stacked with the silicon nitride layers.

A buffer layer 20 may be disposed on the barrier layer 10. The buffer layer 20 may increase a coupling force between the base layer 311 and a semiconductor pattern and/or a conductive pattern. The buffer layer 20 may include at least one of a silicon oxide layer and a silicon nitride layer, and the silicon oxide layer and the silicon nitride layer may be alternately stacked with each other.

A transistor 312-T of the pixel circuit may be disposed on the buffer layer 20. The transistor 312-T may include an active 312-A, a source 312-S, a drain 312-D, and a gate 312-G.

The semiconductor pattern 312-S, 312-A, and 312-D may be disposed on the buffer layer 20. The semiconductor pattern 312-S, 312-A, and 312-D disposed directly on the buffer layer 20 may include silicon semiconductor, polysilicon semiconductor, or amorphous silicon semiconductor. The semiconductor pattern 312-S, 312-A, and 312-D may have different electrical properties depending on whether it is doped or not or whether it is doped with an N-type dopant or a P-type dopant. The semiconductor pattern may include a doped region and a non-doped region. The doped region may be doped with the N-type dopant or the P-type dopant. A P-type transistor may include a doped region doped with the P-type dopant. An N-type transistor may include a doped region doped with the N-type dopant.

The doped region may have a conductivity greater than that of the non-doped region and may substantially serve as an electrode or signal line. The non-doped region may substantially correspond to an active (or a channel) of the transistor. In other words, a portion of the semiconductor pattern 312-S, 312-A, and 312-D may be the active 312-A of the transistor 312-T, another portion of the semiconductor pattern 312-S, 312-A, and 312-D may be the source 312-S or the drain 312-D of the transistor 312-T, and the other portion of the semiconductor pattern 312-S, 312-A, and 312-D may be a connection electrode or a connection signal line.

A first insulating layer 11 may be disposed on the buffer layer 20 and may cover the semiconductor pattern 312-S, 312-A, and 312-D. The first insulating layer 11 may be an inorganic layer and/or an organic layer and may have a single-layer or multi-layer structure. The first insulating layer 11 may include at least one of aluminum oxide, titanium oxide, silicon oxide, silicon oxynitride, zirconium oxide, and hafnium oxide. In the present embodiment, the first insulating layer 11 may have a single-layer structure of a silicon oxide layer. An inorganic layer described later may include at least one of the above-described materials.

The gate 312-G may be disposed on the first insulating layer 11. The gate 312-G may be a portion of a metal pattern. The gate 312-G may overlap the active 312-A when viewed in a plane. The gate 312-G may be used as a self-aligned mask in a process of doping the semiconductor pattern.

A second insulating layer 12 may be disposed on the first insulating layer 11 and may cover the gate 312-G. The second insulating layer 12 may be an inorganic layer and may have a single-layer or multi-layer structure. In the present embodiment, the second insulating layer 12 may have a single-layer structure of a silicon oxide layer.

A third insulating layer 13 may be disposed on the second insulating layer 12. The third insulating layer 13 may be an organic layer and may have a single-layer or multi-layer structure. As an example, the third insulating layer 13 may have a single-layer structure of a polyimide-based resin layer, however, it should not be limited thereto or thereby. According to an embodiment, the third insulating layer 13 may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, and a perylene-based resin. An organic layer described later may include at least one of the above-described materials.

A first connection electrode 312-C1 and a second connection electrode 312-C2 may be disposed on the third insulating layer 13. Each of the first connection electrode 312-C1 and the second connection electrode 312-C2 may be electrically connected to the transistor 312-T through a contact hole formed in the first to third insulating layers 11, 12, and 13.

A fourth insulating layer 14 may be disposed on the third insulating layer 13 and may cover the first connection electrode 312-C1 and the second connection electrode 312-C2. The fourth insulating layer 14 may be an inorganic layer.

A fifth insulating layer 15 may be disposed on the fourth insulating layer 14. The fifth insulating layer 15 may be an organic layer and may have a single-layer or multi-layer structure.

The light emitting element layer 313 may be disposed on the fifth insulating layer 15. The light emitting element layer 313 may include a first electrode 313-E1, a light emitting layer 313-EL, and a second electrode 313-E2.

The first electrode 313-E1 may be electrically connected to the transistor 312-T through a contact hole formed in the fourth insulating layer 14 and the fifth insulating layer 15. The first electrode 313-E1 may overlap at least one transmissive portions 431 (refer to FIG. 6).

A pixel definition layer 16 may be disposed on the fifth insulating layer 15. The pixel definition layer 16 may be provided with an opening through which the first electrode 313-E1 is exposed. When viewed in a plane, the opening may have a shape corresponding to a pixel area PXA.

The light emitting layer 313-EL may be disposed on the first electrode 313-E1. The light emitting layer 313-EL may provide a light having a predetermined color. In the present embodiment, the light emitting layer 313-EL that is patterned and has a single-layer structure is shown as a representative example, however, the present disclosure should not be limited thereto or thereby. As an example, the light emitting layer 313-EL may have a multi-layer structure. In addition, the light emitting layer 313-EL may extend to an upper surface of the pixel definition layer 16.

The second electrode 313-E2 may be disposed on the light emitting layer 313-EL. Although not shown in figures, an electron control layer may be disposed between the second electrode 313-E2 and the light emitting layer 313-EL, and a hole control layer may be disposed between the first electrode 313-E1 and the light emitting layer 313-EL.

According to an embodiment, each of the first electrode 313-E1 and the second electrode 313-E2 may include a transparent conductive material. As an example, each of the first electrode 313-E1 and the second electrode 313-E2 may include at least one of indium tin oxide (ITO), indium zinc oxide (IZO), indium gallium oxide (IGO), indium zinc gallium oxide (IGZO), and mixtures/compounds thereof, however, they should not be limited thereto or thereby.

The encapsulation layer 314 may be disposed on the second electrode 313-E2. The encapsulation layer 314 may include a first inorganic layer 314-1, an organic layer 314-2, and a second inorganic layer 314-3.

The first inorganic layer 314-1 may be disposed on the second electrode 313-E2. The organic layer 314-2 may be disposed on the first inorganic layer 314-1. The second inorganic layer 314-3 may be disposed on the organic layer 314-2 and may cover the organic layer 314-2. The first inorganic layer 314-1 and the second inorganic layer 314-3 may include a silicon nitride layer, a silicon oxynitride layer, a silicon oxide layer, a titanium oxide layer, or an aluminum oxide layer, however, they should not be particularly limited. The organic layer 314-2 may include an acrylate-based organic layer, however, the organic layer 314-2 should not be particularly limited. The input sensing layer 320 may be disposed on the encapsulation layer 314. The input sensing layer 320 may include a first conductive layer 321-M, a first sensing insulating layer 321, a second conductive layer 322-M, and a second sensing insulating layer 322. At least one of the first conductive layer 321-M and the second conductive layer 322-M may include sensors. The input sensing layer 320 may obtain information about the external input based on a variation in capacitance between the sensors.

Figure 6:
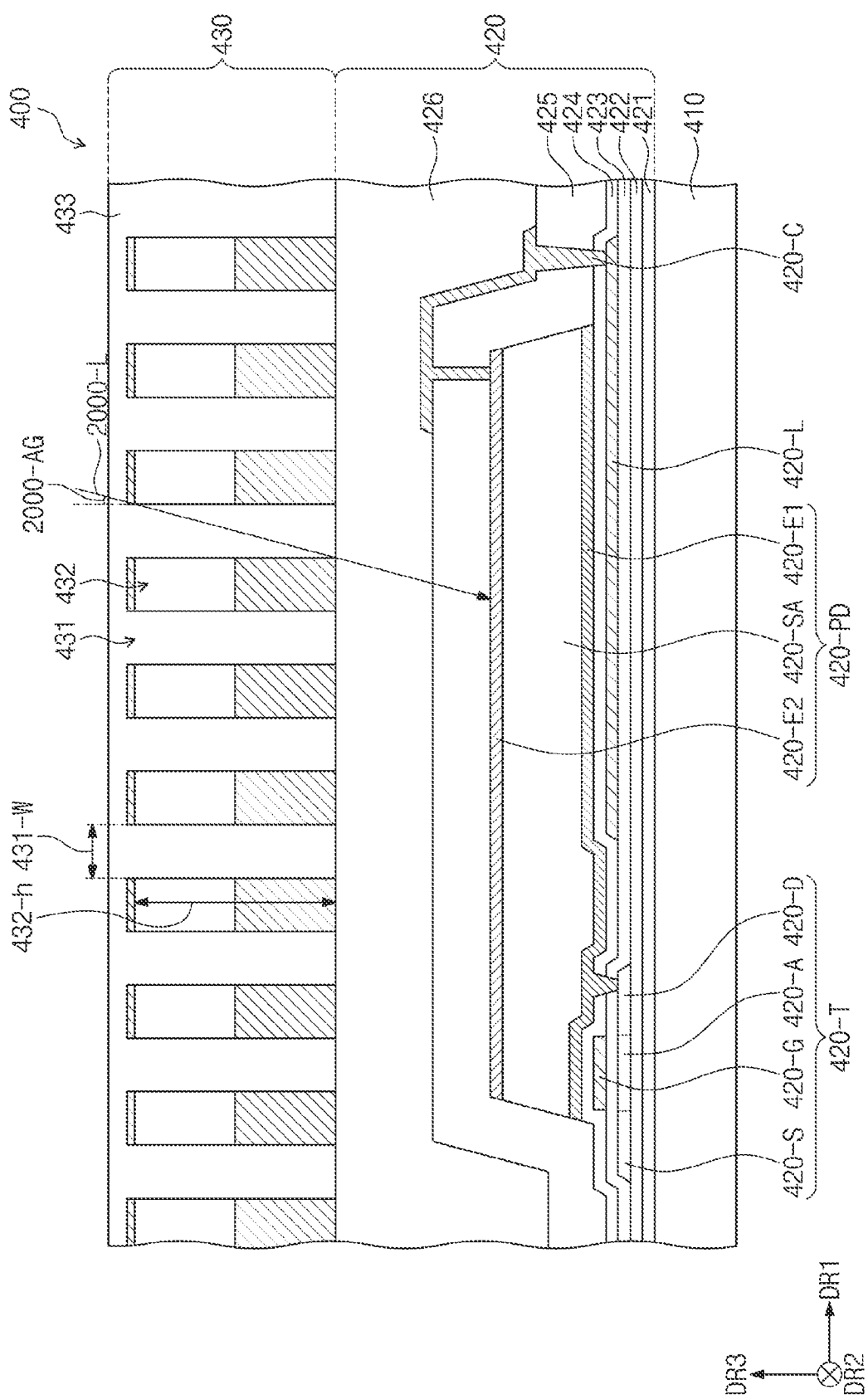
FIG. 6 is a cross-sectional view showing a sensing layer according to an embodiment of the present disclosure.

FIG. 6 is a cross-sectional view showing the sensing layer 400 according to an embodiment of the present disclosure.

Referring to FIG. 6, the sensing layer 400 may include the base layer 410, the biometric information sensing layer 420 disposed on the base layer 410, and the optical pattern layer 430 disposed on the biometric information sensing layer 420.

A barrier layer 421 may be disposed on the base layer 410. A buffer layer 422 may be disposed on the barrier layer 421. Descriptions of the barrier layer 421 and the buffer layer 422 may correspond to the descriptions of the barrier layer 10 and the buffer layer 20 described with reference to FIG. 5.

A transistor 420-T may be disposed on the buffer layer 422. The transistor 420-T may include an active 420-A, a source 420-S, a drain 420-D, and a gate 420-G. The active 420-A, the source 420-S, and the drain 420-D may be disposed on the buffer layer 422.

A first insulating layer 423 may be disposed on the buffer layer 422 and may cover the active 420-A, the source 420-S, and the drain 420-D. The first insulating layer 423 may be an inorganic layer and/or an organic layer and may have a single-layer or multi-layer structure. In the present embodiment, the first insulating layer 423 may have a single-layer structure of a silicon oxide layer.

The gate 420-G and a line layer 420-L may be disposed on the first insulating layer 423. The line layer 420-L may receive a predetermined voltage, e.g., a bias voltage. The line layer 420-L may be electrically connected to a sensing element 420-PD described later.

A second insulating layer 424 may be disposed on the first insulating layer 423 and may cover the gate 420-G and the line layer 420-L. The second insulating layer 424 may be an inorganic layer and may have a single-layer or multi-layer structure. In the present embodiment, the second insulating layer 424 may have a single-layer structure of a silicon oxide layer.

The sensing element 420-PD may be disposed on the second insulating layer 424. The sensing element 420-PD may be electrically connected to the transistor 420-T and the line layer 420-L. For example, an operation of the sensing element 420-PD may be controlled by a signal provided via the transistor 420-T and may receive a predetermined voltage from the line layer 420-L. The sensing element 420-PD may be referred to as a sensor.

The sensing element 420-PD may include a first sensor 420-E1, a sensing layer 420-SA, and a second sensor 420-E2.

The first sensor 420-E1 may be electrically connected to the transistor 420-T through a contact hole formed in the first and second insulating layers 422 and 423. The first sensor 420-E1 may include an opaque conductive material. As an example, the first sensor 420-E1 may include molybdenum (Mo).

The sensing layer 420-SA may be disposed on the first sensor 420-E1. The sensing layer 420-SA may include amorphous silicon.

The second sensor 420-E2 may be disposed on the sensing layer 420-SA. The second sensor 420-E2 may include a transparent conductive material. As an example, the second sensor 420-E2 may include indium tin oxide (ITO).

A third insulating layer 425 may be disposed on the second sensor 420-E2. The third insulating layer 425 may be an inorganic layer and may have a single-layer or multi-layer structure. As an example, the third insulating layer 425 may include a silicon oxide layer and a silicon nitride layer.

A connection electrode 420-C may be disposed on the third insulating layer 425. The connection electrode 420-C may be electrically connected to the second sensor 420-E2 through a contact hole formed in the third insulating layer 425. In addition, the connection electrode 420-C may be connected to the line layer 420-L through a contact hole formed in the second and third insulating layers 424 and 425.

A fourth insulating layer 426 may be disposed on the third insulating layer 425 and may cover the connection electrode 420-C. The fourth insulating layer 426 may be an organic layer and may have a single-layer or multi-layer structure. As an example, the fourth insulating layer 426 may have a single-layer structure of a polyimide-based resin layer.

The optical pattern layer 430 may be disposed on the biometric information sensing layer 420. According to an embodiment, the optical pattern layer 430 may be disposed directly on the biometric information sensing layer 420. As an example, the optical pattern layer 430 may be disposed directly on the fourth insulating layer 426. That is, the optical pattern layer 430 and the biometric information sensing layer 420 may be formed through successive processes.

The optical pattern layer 430 may include a plurality of transmissive portions 431 and a light blocking portion 432. The light blocking portion 432 may include a light blocking layer, an intermediate layer, and a metal layer. Details of the light blocking portion 432 will be described with reference to FIGS. 8A and 8B.

The transmissive portions 431 may have an optical transparency and at least a portion of the light blocking portion 432 may have a property of absorbing light. Light 2000-L reflected by the fingerprint 2000 may be incident into the sensing element 420-PD after passing through the transmissive portions 431.

In a case where an incident angle 2000-AG is greater than a predetermined angle, not only light reflected by a valley of the fingerprint 2000 (refer to FIG. 1) corresponding to the sensing element 420-PD but also light reflected by another valley adjacent to the valley may be incident onto the sensing element 420-PD. This may cause a deterioration in accuracy of the fingerprint recognition. According to an embodiment, the incident angle 2000-AG of the light that may transmit through the optical pattern layer 430 may be limited by the optical pattern layer 430. As an example, only the light incident at a predetermined incident angle 2000-AG (or referred to as a maximum incident angle) or less may be incident onto the sensing element 420-PD due to the optical pattern layer 430. Accordingly, the accuracy and sensitivity of the fingerprint recognition may be improved.

According to an embodiment, a maximum incident angle 2000-AG may be determined by taking into account a half of a pitch of the fingerprint 2000 (refer to FIG. 1) and a separation distance between an outermost surface of the electronic device 1000 (refer to FIG. 1) and an upper surface of the optical pattern layer 430. As an example, the pitch of the fingerprint 2000 may be defined by a distance between a valley and another valley or a distance between a ridge and another ridge. The pitch of the fingerprint 2000 may be within a range equal to or greater than about 400 micrometers and equal to or smaller than about 600 micrometers. The separation distance may be a distance between the upper surface of the optical pattern layer 430 and an upper surface of the window 100 (refer to FIG. 2).

As an example, when the pitch of the fingerprint 2000 is about 400 micrometers and the separation distance is about 800 micrometers, the maximum incident angle 2000-AG may be defined by $\tan^{-1}(200/800)$ and may be about 14 degrees. In addition, when the pitch of the fingerprint 2000 is about 600 micrometers and the separation distance is about 800 micrometers, the maximum incident angle 2000-AG may be defined by $\tan^{-1}(300/800)$ and may be about 20 degrees. The predetermined angle may be set as a design condition in consideration of the pitch of the fingerprint 2000 and the separation distance.

The incident angle 2000-AG may be controlled by a ratio of a width 431-W of each of the transmissive portions 431 to a height (or thickness 432-$h$) of the light blocking portion 432. As an example, the maximum incident angle 2000-AG of the light passing through the optical pattern layer 430 is required to be equal to or lower than about 15 degrees, the ratio of the width 431-W of each of the transmissive portions 431 to the height (or thickness 432-*h*) of the light blocking portion 432 may be set to satisfy the following Equation.

$$\text{width}(431\text{-}W)/\text{height}(432\text{-}h) \leq \tan(15\ \text{degrees}) \quad \text{Equation}$$

width (431-W)/height (432-*h*) may be equal to or smaller than about 0.2679. That is, a ratio of the width 431-W to the height 432-*h* may be 1:3.74 or more. As an example, the height 432-*h* may be equal to or greater than 1/tan (AG) times the width 431-W. The AG may be an angle set according to the design condition. When the height 432-*h* is 1/tan (AG) times the width 431-W, the angle may correspond to the maximum incident angle 2000-AG of the light that may transmit the optical pattern layer 430.

The height 432-*h* may be set to be equal to or greater than about 3.74 times the width 431-W. As an example, the ratio of the width 431-W to the height 432-*h* may be set to about 1:3.75. When the width 431-W is about 2 micrometers, the height 432-*h* may be about 7.5 micrometers.

An upper limit of the ratio of the width 431-W to the height 432-*h* may be determined in consideration of the transmittance. As an example, as the ratio of the width 431-W to the height 432-*h* increases, the amount of the light transmitting through the transmissive portions 431 may decrease. Accordingly, the ratio of the width 431-W to the height 432-*h* may be determined in consideration of the above-mentioned transmittance, and, as an example, the ratio of the width 431-W to the height 432-*h* may be equal to or smaller than about 1:5. However, the upper limit of the ratio of the width 431-W to the height 432-*h* should not be limited thereto or thereby. According to an embodiment, one sensing element 420-PD may overlap a plurality of transmissive portions 431. The pitch between the sensing element 420-PD and another sensing element (not shown) adjacent to the sensing element 420-PD may be about 50 micrometers, and a distance between the sensing elements 420-PD adjacent to each other may be about 7.5 micrometers. Accordingly, the second sensor 420-E2 may have a width of about 42.5 micrometers. In this case, the plural transmissive portions 431 each having a width of about 2 micrometers may be disposed on the second sensor 420-E2. That is, one second sensor 420-E2 may overlap at least one transmissive portions 431.

Figure 7:
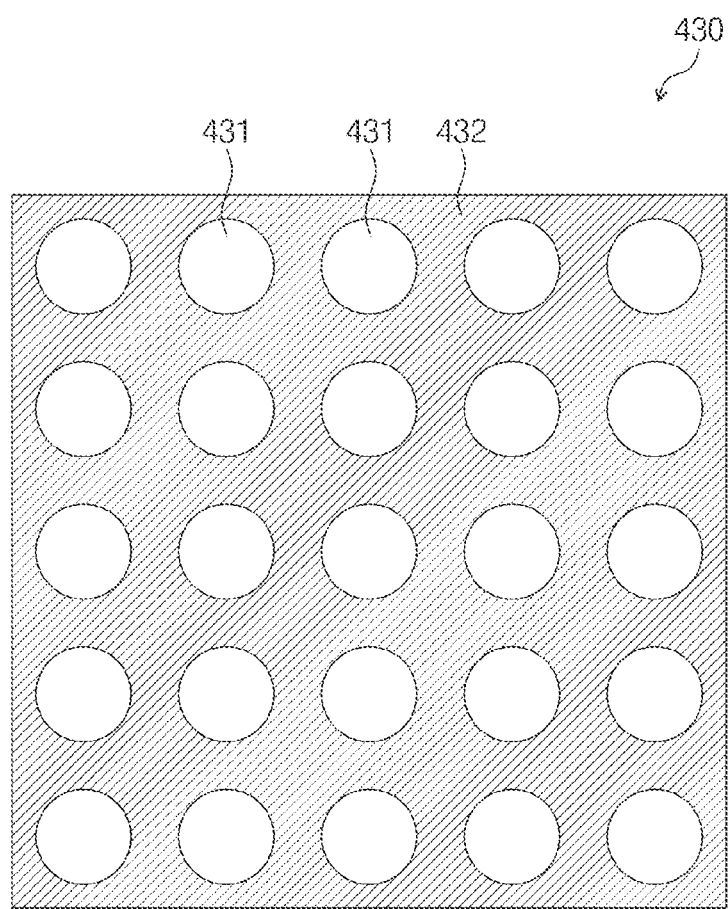
FIG. 7 is a plan view showing an optical pattern layer according to an embodiment of the present disclosure.
Figure 7:
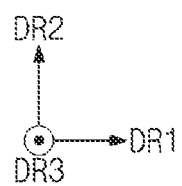

FIG. 7 is a plan view showing the optical pattern layer 430 according to an embodiment of the present disclosure.

Referring to FIG. 7, the optical pattern layer 430 may include the transmissive portions 431 and the light blocking portion 432 surrounding the transmissive portions 431.

When viewed in a plane, each of the transmissive portions 431 may have a circular shape. The shape of the transmissive portions 431 should not be limited to the circular shape, and each of the transmissive portions 431 may have a variety of shapes, such as an oval shape, a polygonal shape, or the like. The transmissive portions 431 may be arranged in the first direction DR1 and in second direction DR2. As an example, the transmissive portions 431 may be arranged in a matrix form. Although not shown in the plan view, the light blocking portion 432 may include the light blocking layer, the intermediate layer disposed on the light blocking layer, and the metal layer disposed on the intermediate layer. The light blocking portion 432 will be described in detail with reference to the following cross-sectional views.

Figure 8A:
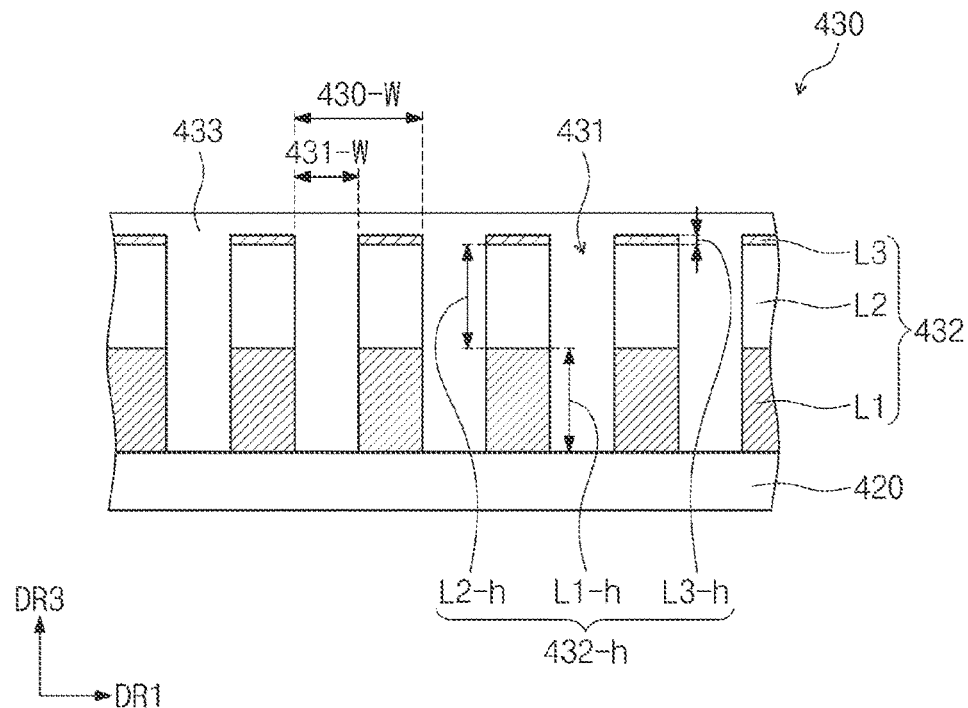
FIGS. 8A and 8B are cross-sectional views showing optical pattern layers according to an embodiment of the present disclosure.
Figure 8B:
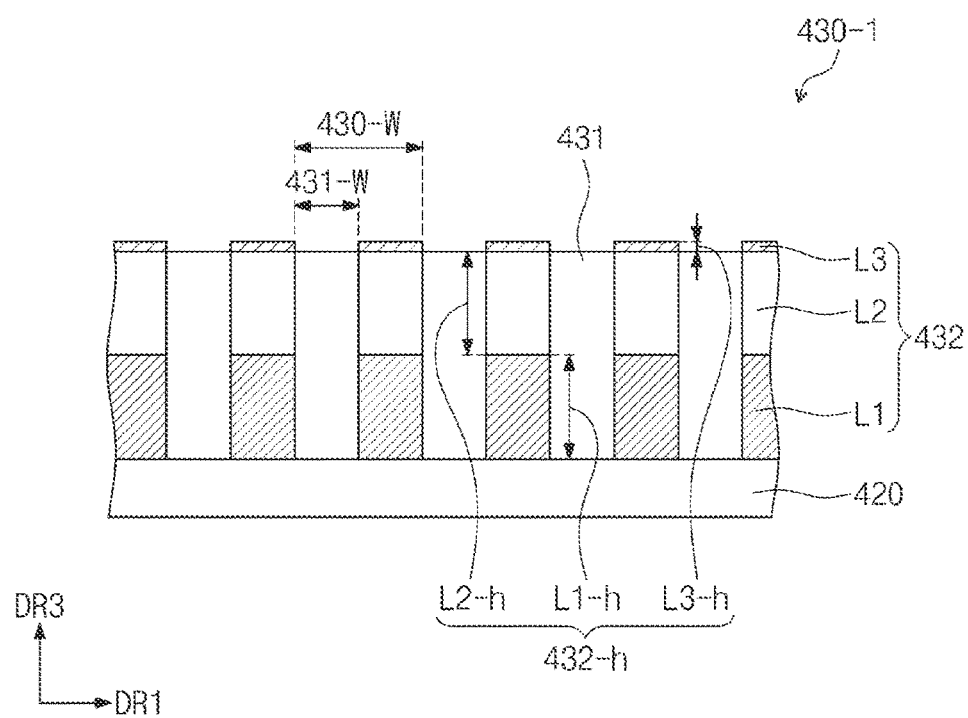

FIGS. 8A and 8B are cross-sectional views showing optical pattern layers 430 and 430-1 according to an embodiment of the present disclosure.

FIG. 8A shows the optical pattern layer 430 according to an embodiment of the present disclosure, and FIG. 8B shows the optical pattern layer 430-1 according to an embodiment of the present disclosure.

Referring to FIG. 8A, the optical pattern layer 430 may be disposed on the biometric information sensing layer 420. The optical pattern layer 430 may include the transmissive portions 431 and the light blocking portion 432. The transmissive portions 431 may include a transparent (transmissive) material. The light blocking portion 432 may include an opaque (non-transmissive) material.

The light blocking portion 432 may include the light blocking layer L1, the intermediate layer L2, and the metal layer L3.

The light blocking layer L1 may be disposed on the biometric information sensing layer 420. The light blocking layer L1 may include the non-transmissive material. As an example, the light blocking layer L1 may include an opaque organic layer. The light blocking layer L1 may include a black organic layer. The light blocking layer L1 may include the same material as that of a black matrix or a black pixel definition layer. The light blocking layer L1 may absorb or block the light incident thereto. The light blocking layer L1 may have a thickness L1-*h* of from about 4 μm to about 5 μm. In this case, the thickness may correspond to a length in the third direction DR3. The thickness may be referred to as a height.

The intermediate layer L2 may include a transparent or opaque organic layer. The intermediate layer L2 may be disposed on the light blocking layer L1. The intermediate layer L2 may include a transmissive or non-transmissive material. However, the intermediate layer L2 does not include a material that absorbs or block the light as does the light blocking layer L1. The intermediate layer L2 may have a thickness L2-*h* that is equal to or greater than the thickness L1-*h* of the light blocking layer L1. As an example, the thickness L2-*h* of the intermediate layer L2 may be equal to or greater than about 5 μm.

The metal layer L3 may include a metal material. The metal material may include at least one of molybdenum, titanium, and aluminum, however, it should not be limited thereto or thereby. As an example, the thickness L3-*h* of the metal layer L3 may be about 100 angstroms.

The transmissive portions 431 may be defined as portions in which the light blocking layer L1, the intermediate layer L2, and the metal layer L3 are removed. The transmissive portions 431 may be formed to pass through the light blocking layer L1, the intermediate layer L2, and the metal layer L3 in a straight line shape. Each of the transmissive portions 431 may have the width 431-*w* of about 2 μm. In the present embodiment, the width may correspond to a maximum length in the first direction DR1. When the shape of each of the transmissive portions 431 is a circle, the width 431-*w* may correspond to a diameter.

According to an embodiment, a ratio of the thickness L1-*h* of the light blocking layer L1 to the width 431-*w* of each of the transmissive portions 431 may be about 2:1. As an example, when the thickness L1-*h* of the light blocking layer L1 is about 4 μm, the width 431-*w* of each of the transmissive portions 431 may be about 2 μm. In the present embodiment, in a case where the thickness L1-*h* of the light blocking layer L1 is about 4 μm and the width 431-*w* of each of the transmissive portions 431 is about 2 μm, the maximum incident angle 2000-AG of the light transmitting the optical pattern layer 430 may be smaller than about 10 degrees.

The shortest distance between two transmissive portions adjacent to each other among the transmissive portions 431 may be the same as the width 431-w of each of the transmissive portions 431. That is, when the width 431-w of each of the transmissive portions 431 is about 2 μm, the shortest distance between two transmissive portions adjacent to each other may be about 2 μm. A distance 430-w obtained by summing the width 431-w of each of the transmissive portions 431 and the shortest distance between two transmissive portions adjacent to each other may be about 4 μm, and the distance 430-w may be the same as the thickness L1-h of the light blocking layer L1.

The optical pattern layer 430 may include a transmissive layer 433. The transmissive layer 433 may cover the light blocking portion 432 and may fill the transmissive portions 431. The transmissive layer 433 may have a thickness greater than the thickness 432-h (refer to FIG. 6) of the light blocking portion 432.

The transmissive layer 433 may include a filling portion which fills the transmissive portions 431 and a cover portion that covers the light blocking portion 432. The cover portion may correspond to a portion of the transmissive layer 433 except the filling portion which fills the transmissive portions 431. The cover portion may cover the metal layer L3.

The filling portion and the cover portion of the transmissive layer 433 may include the same material and may be provided integrally with each other.

In FIG. 8B, the same reference numerals denote the same elements, and thus, detailed descriptions of the same elements will be omitted. In FIG. 8B, a thickness 432-h (refer to FIG. 6) of a light blocking portion 432 may be greater than a thickness of a transmissive layer 433.

As an example, the thickness of the transmissive layer 433 may be the same as a value obtained by summing a thickness L1-h of a light blocking layer L1 and a thickness L2-h of an intermediate layer L2.

Figure 9:
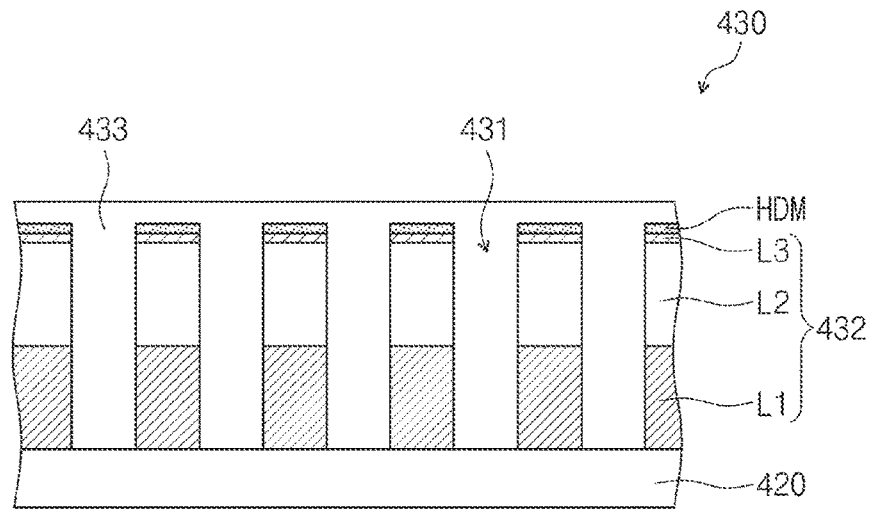
FIG. 9 is a cross-sectional view showing an optical pattern layer according to an embodiment of the present disclosure.
Figure 10:
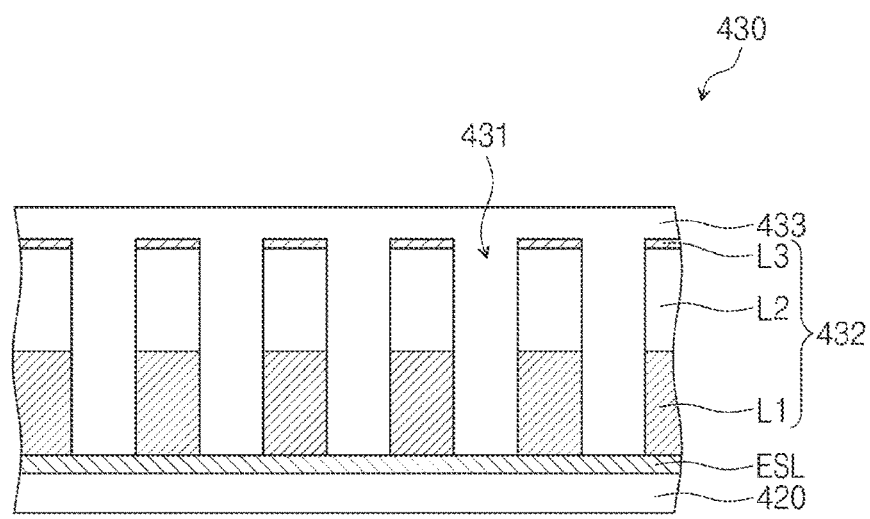
FIG. 10 is a cross-sectional view showing an optical pattern layer according to an embodiment of the present disclosure.

FIG. 9 is a cross-sectional view showing an optical pattern layer 430 according to an embodiment of the present disclosure, and FIG. 10 is a cross-sectional view showing an optical pattern layer 430 according to an embodiment of the present disclosure.

Referring to FIG. 9, the optical pattern layer 430 may further include an additional pattern layer HDM. The additional pattern layer HDM may be disposed on a metal layer L3. The additional pattern layer HDM may entirely overlap the metal layer L3.

A transmissive layer 433 may cover the additional pattern layer HDM. A plurality of transmissive portions 431 may be formed through the additional pattern layer HDM.

According to an embodiment, the additional pattern layer HDM may include a hard mask. That is, the additional pattern layer HDM may serve as a hard mask required to pattern the transmissive portions 431.

Referring to FIG. 10, a stopper layer ESL may be disposed between a biometric information sensing layer 420 and the optical pattern layer 430. The stopper layer ESL may correspond to an etching stopping layer that has an excellent etching selectivity with the light blocking portion 432. For example, the stopper layer ESL may have an excellent etching selectivity with the light blocking layer L1. That is, the stopper layer ESL may protect the biometric information sensing layer 420 from being etched during an etching process in which the transmissive portions 431 are formed.

FIGS. 11A to 11D are cross-sectional views showing processes of manufacturing the optical pattern layer 430 according to an embodiment of the present disclosure.

Figure 11A:
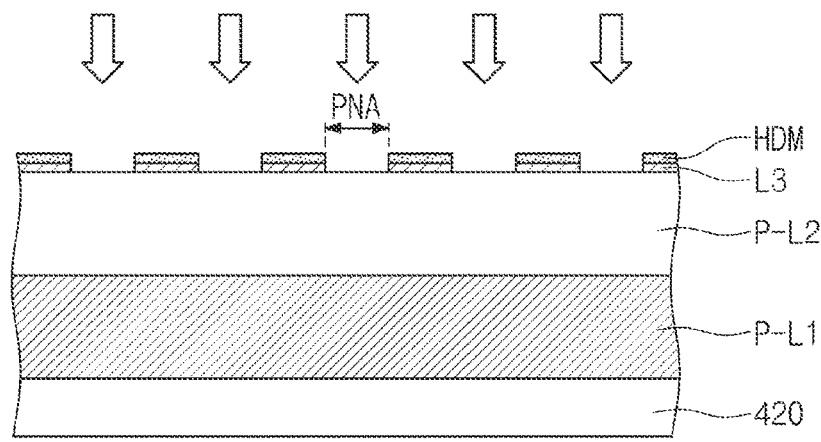
FIGS. 11A, 11B, 11C and 11D are cross-sectional views showing processes of manufacturing an optical pattern layer according to an embodiment of the present disclosure.
Figure 11B:
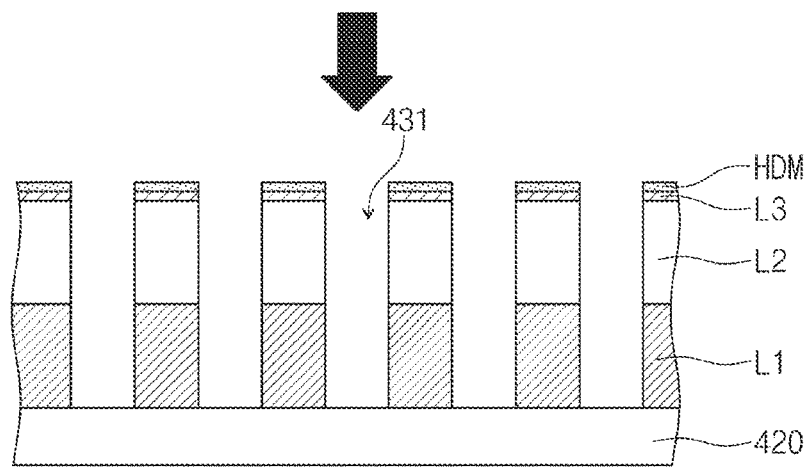

In FIGS. 11A and 11B, a preliminary light blocking layer P-L1 may be formed on the biometric information sensing layer 420. The preliminary light blocking layer P-L1 may be an opaque organic layer including a non-transmissive material. The preliminary light blocking layer P-L1 may have a thickness of about 4 μm to about 5 μm.

Then, a preliminary intermediate layer P-L2 may be disposed on the preliminary light blocking layer P-L1. The preliminary intermediate layer P-L2 may be a transparent or opaque organic layer. The preliminary intermediate layer P-L2 may be formed on the preliminary light blocking layer P-L1 to entirely overlap the preliminary light blocking layer P-L1.

A preliminary metal layer may be formed on the preliminary intermediate layer P-L2. The preliminary metal layer may be formed on the intermediate layer P-L2 to entirely overlap the preliminary intermediate layer P-L2.

A preliminary additional pattern layer may be formed on the preliminary metal layer. The preliminary additional pattern layer may be formed on the preliminary metal layer to entirely overlap the preliminary metal layer. The preliminary additional pattern layer and the preliminary metal layer may be patterned to form an additional pattern layer HDM and a metal pattern layer L3, respectively, using a photolithograph. The additional pattern layer HDM may be disposed on the metal layer L3. The additional pattern layer HDM may serve as the hard mask for etching the light blocking portion 432. The additional pattern layer HDM may be the hard mask for patterning the transmissive portions 431. When the metal layer L3 serves as a mask for patterning the transmissive portions 431, a process of forming the additional pattern layer HDM may be omitted. The additional pattern layer HDM and the metal layer L3 may include a plurality of openings PNA defined therethrough.

After that, the transmissive portions 431 may be formed through a dry etch using the additional pattern layer HDM and/or the metal layer L3 as an etching mask. The transmissive portions 431 may correspond to empty spaces defined by the light blocking layer L1, the intermediate layer L2, and the metal layer L3, each of which has side walls having the straight line shape. After the transmissive portions 431 is formed, the additional pattern layer HDM may be removed. However, the additional pattern layer HDM may not be removed to form the optical pattern layer 430 which include the additional pattern layer HDM disposed on the metal layer L3 as disclosed in FIG. 9.

Figure 11C:
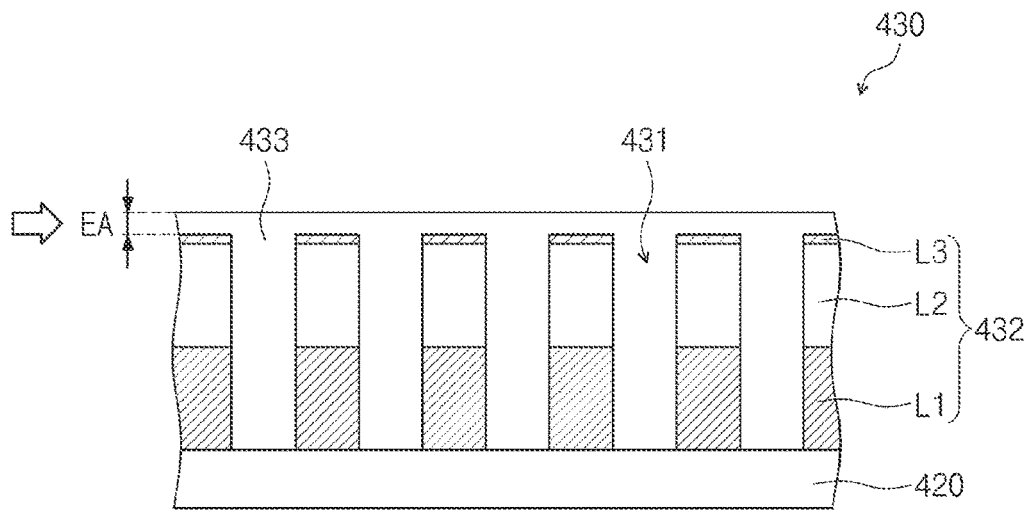

In FIG. 11C, the transmissive portions 431 are filled with a transparent organic layer. The transmissive layer 433 may completely fill the transmissive portions 431 and covers an upper surface of the metal layer L3. The transmissive layer 433 may be the transparent organic layer. That is, the transmissive layer 433 may include a filling portion which fills the transmissive portions 431 and a cover portion that covers the metal layer L3. The forming of the transmissive portions 431 may include forming the light blocking layer L1 from the preliminary light blocking layer P-L1, forming the intermediate layer L2 from the preliminary intermediate layer P-L2, and forming the metal layer L3 from the preliminary metal layer. That is, the forming of the transmissive portions 431 may include forming the light blocking portion 432.

Figure 11D:
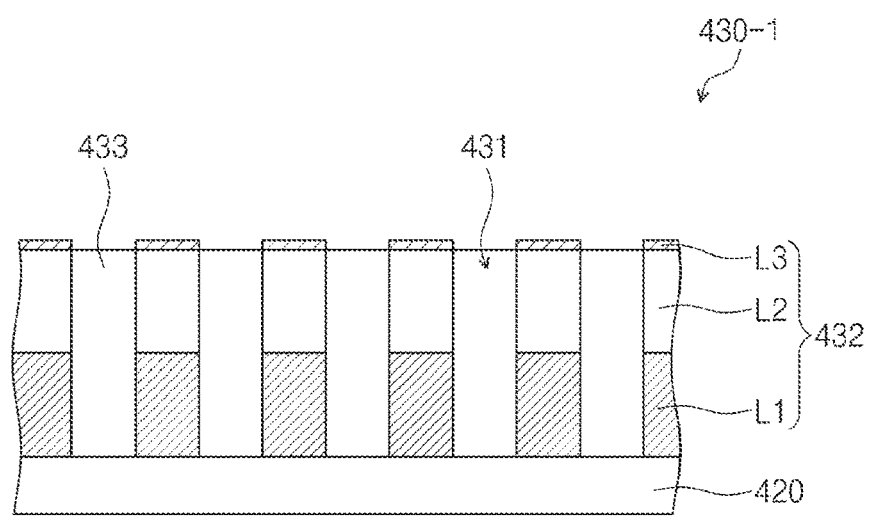

In FIGS. 11C and 11D, the transmissive layer 433 may include the cover portion EA. The cover portion EA may correspond to the portion of the transmissive layer 433 except a portion of the transmissive layer 433 filling spaces between the light blocking portions 432. That is, the cover portion EA may correspond to the portion covering the metal layer L3. The cover portion EA may be removed by a chemical-mechanical polishing (CMP) process or an etch back process. When the cover portion EA is removed, the metal layer L3 may be exposed to the outside and the transmissive layer 433 filling spaces between the light blocking portions 432 may be partially removed. In the present embodiment, the height of the transmissive portions 431 may be smaller than the height 432-$h$ (refer to FIG. 6) of the light blocking portion 432.

Although the embodiments of the present disclosure have been described, it is understood that the present disclosure should not be limited to these embodiments but various changes and modifications can be made by one ordinary skilled in the art within the spirit and scope of the present disclosure as hereinafter claimed. Therefore, the disclosed subject matter should not be limited to any single embodiment described herein, and the scope of the present inventive concept shall be determined according to the attached claims.

What is claimed is:

1. An electronic device comprising:
a display panel;
a biometric information sensing layer disposed under the display panel and comprising a sensor, the sensor including a first sensor electrode, a second sensor electrode, and a sensing layer between the first sensor electrode and the second sensor electrode; and
an optical pattern layer disposed between the display panel and the biometric information sensing layer and comprising a plurality of transmissive portions and a light blocking portion, the light blocking portion comprising:
a light blocking layer disposed on the biometric information sensing layer and including an opaque organic material;
an intermediate layer directly disposed on the light blocking layer and including an organic material;
a metal layer directly disposed on the intermediate layer, and
an additional pattern layer directly disposed on the metal layer and being formed of a material different from materials forming the metal layer and the intermediate layer,
wherein a thickness of the metal layer is thinner than that of the light blocking layer,
wherein each of the plurality of transmissive portions is a hole passing through the light blocking layer, the intermediate layer, the metal layer, and the additional pattern layer, and
wherein the light blocking layer, the intermediate layer, the metal layer and the additional pattern layer have a same shape in a plan view.

2. The electronic device of claim 1, wherein a ratio of a thickness of the light blocking layer to a width of each of the transmissive portions is about 2:1.

3. The electronic device of claim 1, wherein a thickness of the light blocking layer is within a range from about 4 um to about 5 um.

4. The electronic device of claim 1, wherein a width of each of the transmissive portions is the same as the shortest distance between two transmissive portions adjacent to each other among the transmissive portions.

5. The electronic device of claim 1, wherein the intermediate layer comprises a transmissive material or the non-transmissive material.

6. The electronic device of claim 1, wherein the optical pattern layer further comprises a transmissive layer covering the light blocking portion and filling the transmissive portions.

7. The electronic device of claim 6, wherein the transmissive layer covering the light blocking portion and filling the transmissive portions comprises a same material.

8. The electronic device of claim 6, wherein the transmissive layer has a thickness greater than a thickness of the light blocking layer.

9. The electronic device of claim 1, wherein the metal layer comprises at least one of molybdenum, titanium, and aluminum.

10. The electronic device of claim 1, wherein the display panel comprises an active area in which an image is displayed and a peripheral area surrounding the active area, the biometric information sensing layer comprises a sensing area in which biometric information are sensed, and the sensing area entirely overlaps the active area.

11. The electronic device of claim 1, further comprising a stopper layer disposed between the biometric information sensing layer and the optical pattern layer.

12. The electronic device of claim 1, wherein a transmissive layer disposed in each of the transmissive portions has a thickness smaller than a sum of thicknesses of the light blocking layer, the intermediate layer, and the metal layer.

13. A method of manufacturing an electronic device, comprising:
forming a preliminary light blocking layer on a biometric information sensing layer comprising a sensor, the sensor including a first sensor electrode, a second sensor electrode, and a sensing layer between the first sensor electrode and the second sensor electrode, and the preliminary light blocking layer including an opaque organic material;
forming a preliminary intermediate layer directly on the preliminary light blocking layer, the preliminary intermediate layer including an organic material;
forming a preliminary metal layer directly on the preliminary intermediate layer;
forming a preliminary additional pattern layer directly on the preliminary metal layer, the preliminary additional pattern layer being formed of a material different from materials forming the metal layer and the intermediate layer;
patterning the preliminary additional pattern layer, the preliminary metal layer, the preliminary intermediate layer, and the preliminary light blocking layer to form an additional pattern layer, a metal layer, an intermediate layer, and a light blocking layer through which a plurality of transmissive holes are formed; and
forming a transmissive layer filling the plurality of transmissive holes and covering an upper surface of the additional pattern layer,
wherein a thickness of the metal layer is thinner than that of the light blocking layer, and
wherein the light blocking layer, the intermediate layer, the metal layer and the additional pattern layer have a same shape in a plan view.

14. The method of claim 13, wherein the forming of the transmissive holes comprises etching the additional pattern layer, the preliminary metal layer, the preliminary intermediate layer, and the preliminary light blocking layer in an area corresponding to the plurality of transmissive holes using a same etching mask.

15. The method of claim 13, wherein a ratio of a thickness of the light blocking layer to a width of each of the plurality of transmissive holes is about 2:1.

16. The method of claim 13, wherein a cover portion covering the metal layer has a thickness greater than a thickness of the metal layer.

17. The method of claim 16, further comprising removing the cover portion to expose the upper surface of the additional layer.

* * * * *